Feb. 14, 1967 R. NOVICK ETAL 3,304,516
OPTICALLY PUMPED ATOMIC RESONANCE APPARATUS WITH
IMPROVED OPTICAL PUMPING MEANS
Filed Oct. 5, 1964
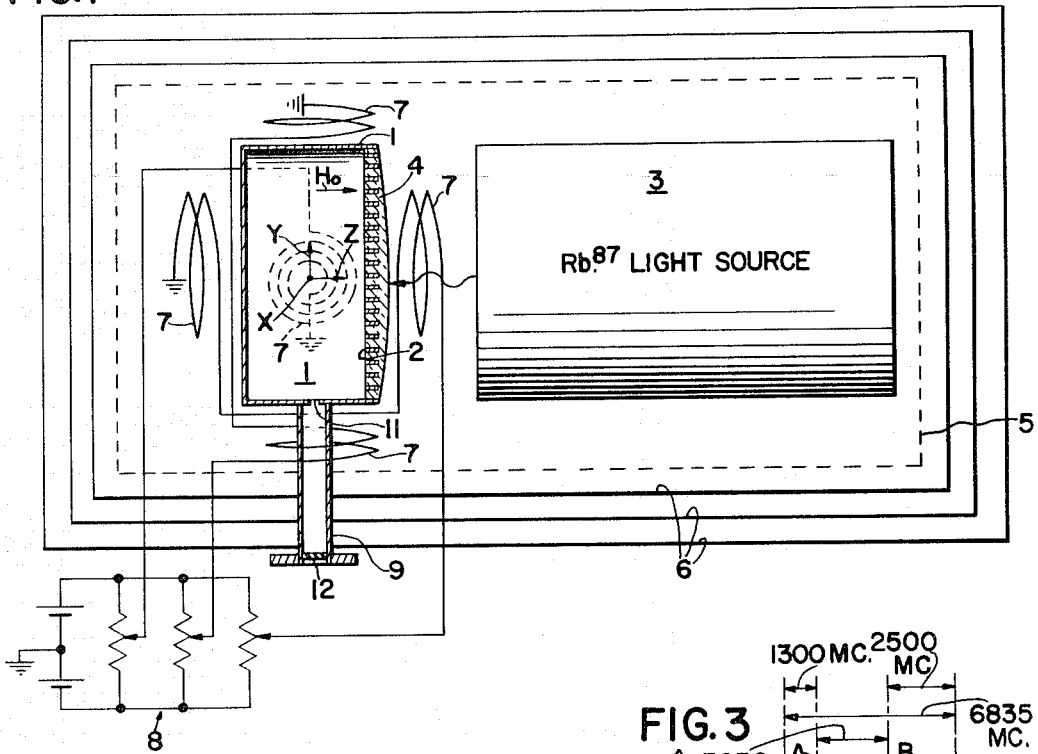
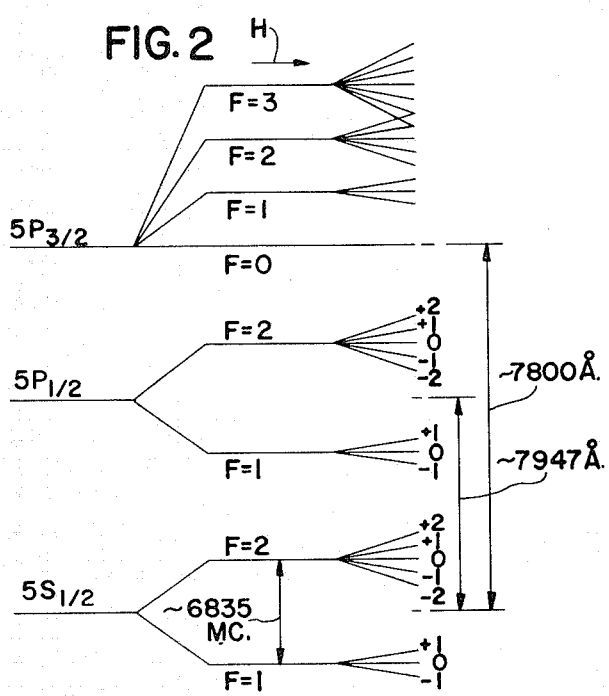
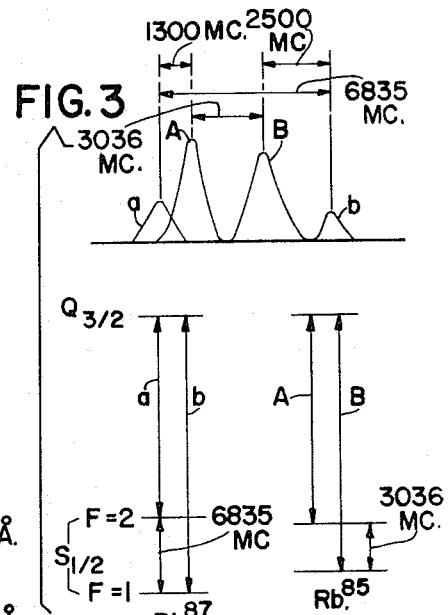
INVENTORS
ROBERT NOVICK
PAUL DAVIDOVITS
BY
ATTORNEY

FIRST EXCITED P STATE

GROUND STATE $F=2$
$5S_{1/2}$
$F=1$ $h\nu_1$ $h\nu_2$

INVENTORS
ROBERT NOVICK
PAUL DAVIDOVITS
BY [signature]
ATTORNEY

United States Patent Office 3,304,516
Patented Feb. 14, 1967

3,304,516
OPTICALLY PUMPED ATOMIC RESONANCE APPARATUS WITH IMPROVED OPTICAL PUMPING MEANS
Robert Novick, Hartsdale, and Paul Davidovits, New York, N.Y., assignors to Varian Associates, Palo Alto, Calif., a corporation of California
Filed Oct. 5, 1964, Ser. No. 401,450
9 Claims. (Cl. 331—94)

The present invention relates in general to optically pumped atomic resonance apparatus and more particularly to such apparatus provided with an improved pumping light source to reduce undesired shifts in the microwave resonance frequency of the pumped atoms as a function of changes in pumping light intensity. Such improved apparatus is particularly useful in optically pumped atomic frequency standards (atomic clocks) and magnetometers.

Heretofore, in optically pumped atomic resonance devices it has been found that the resonance frequency of the atoms was responsive to changes in the intensity of the pumping light. Such changes in the resonant frequency of the atomic R.F. or microwave transition with intensity changes in the pumping light are referred to as "light shifts." It was observed that the light shift was a function of the frequency of the pumping light relative to the optical pumping transition frequency of the atom. It was found that by shifting the frequency of the magnetic field dependent components of the pumping light applied to the atoms to be pumped that the light shift could be eliminated, see M. Arditi, et al., "Physical Review," vol. 124, Number 3, November 1, 1961, pages 800–809 at page 808. The pumping light components were shifted in frequency by varying the magnetic field over the lamp or filter relative to the field over the atoms to be pumped. Typically such light shifting magnetic field intensities, which are to be applied to the filter cell or to the lamp, are on the order of 500 gauss. Such relatively strong magnetic fields are difficult to completely shield from the atoms to be pumped and therefore eliminating light shift by this method is to be voided if possible.

In the present invention, undesired light shifts in the atomic resonant frequency of the atoms under observation are annulled by use of two separate light sources, one of the light sources having its spectral resonance line "tailored" slightly above the optical pumping transition frequency of the atoms to be pumped and the other of the pumping light sources having its spectral resonance lines tailored slightly below the optical pumping transition frequency of the atoms to be pumped such that the aforementioned positive and negative light shifts annul each other producing a zero total effective light shift. Tailoring of the spectral lines of the pumping light sources is accomplished by proper choice of carrier gas in the lamps or filters, lamp and/or filter temperature, the atomic isotopic composition in the lamps and/or filters, and the lamp and/or filter geometry and manner of lamp excitation. The zero light shift condition is easily determined by simultaneously changing the intensity of both light sources without disturbing their relative intensities. Such a change should produce no change in the microwave or R.F. resonant frequency of the pumped atoms if the relative intensities and frequencies of the spectral lines of the light sources have been properly chosen.

The principal object of the present invention is to provide improved optically pumped atomic resonance apparatus having improved optical pumping means whereby undesired light shifts are eliminated.

One feature of the present invention is the provision of a pair of light sources for optically pumping the atoms under observation, one of the light sources having a positive light shift and the other light source having a negative light shift, and the ratio of intensities of the light sources being proportioned to produce a substantially negligible light shift of the atoms being pumped.

Another feature of the present invention is the same as the preceding feature wherein the lamp of one of the light sources is caused to have a positive light shift and the other lamp of the second light source is caused to have a negative light shift.

Another feature of the present invention is the same as the preceding feature wherein a pair of separately variable light transmission filters are included for separately adjusting the intensity of the light passed from the respective lamps to the ensemble of atoms being pumped.

Other features and advantages of the present invention will become apparent upon a perusal of the following specification taken in connection with the accompanying drawings wherein:

FIG. 1 is a longitudinal sectional schematic view of an alkali vapor maser incorporating features of the present invention;

FIG. 2 is a simplified energy diagram (not to scale) for rubidium showing the optical pumping transitions;

FIG. 3 is a combined energy level diagram and spectral resonance plot for the optical pumping transitions of the $Rb^{87}$ and $Rb^{85}$ atoms, respectively;

Figures 4, 5:
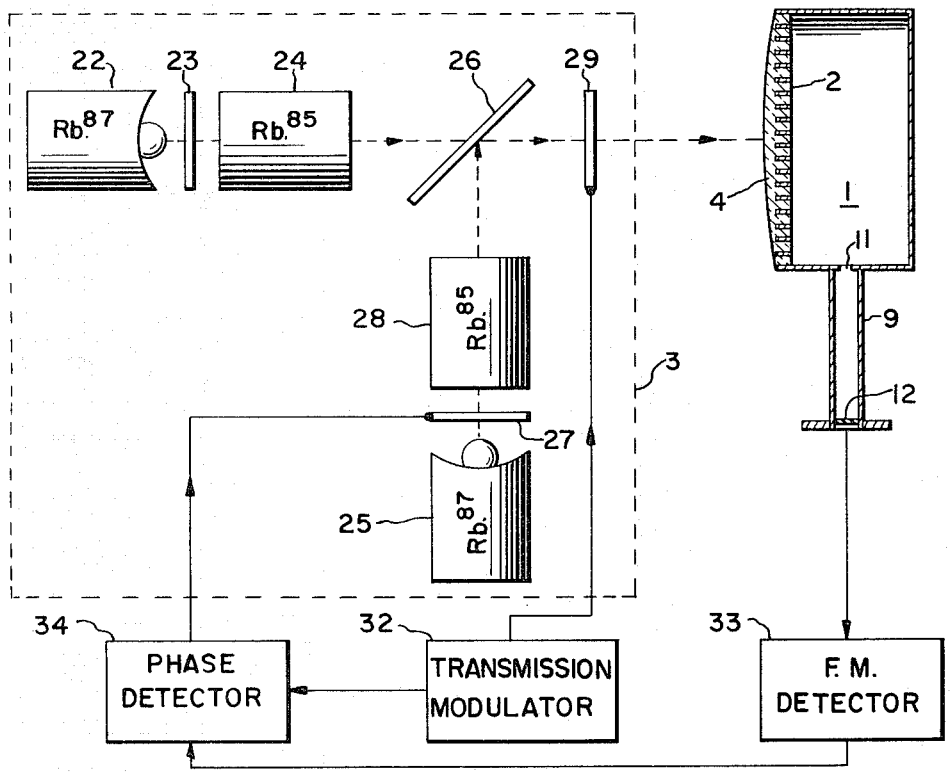
FIG. 4 is a partial energy diagram for $Rb^{87}$ showing the effect of optical pumping radiation on the microwave transition frequency of the $Rb^{87}$ atom.
FIG. 5 is an enlarged schematic diagram showing the two source optical pumping feature of the present invention.

Referring now to FIG. 1, there is shown in longitudinal sectional view an alkali vapor maser oscillator incorporating novel optical pumping features of the present invention. More specifically, an ensemble of suitable atomic resonance gaseous atoms, such as, for example, $Rb^{87}$ vapor as formed by depositing inside of a gas tight cavity resonator 1 a suitable quantity of the resonant atoms, such as, for example, 2 mg. of $Rb^{87}$ metal, at room temperature. The cavity is then filled with a suitable nonmagnetic buffer gas such as, for example, nitrogen to a pressure of about 11 torr at room temperature. The cavity in use is heated to a suitable operating temperature as of 60° C. which causes the $Rb^{87}$ metal to vaporize and mix in with the buffer gas.

The cavity resonator 1 is tuned to the microwave resonance frequency of the particular atomic transition under observation, such as, for example, the ($F=2$, $m=0 \rightarrow F=1$, $m=0$), ground state transition of rubidium at approximately 6835 mc. The cavity is dimensioned to have a high Q. For example, in a preferred embodiment of the present invention, the cavity 1 is a cylindrical cavity dimensioned for operation on a $TE_{0,2,1}$ mode and having a Q of approximately 75,000.

A wall 2 of the cavity resonator 1 is perforated to make same light transparent. The perforated end wall 2 of the cavity resonator 1 has a suitable light transparency, as of, for example, 50%. A glass window 4 is sealed over the perforated end wall 2 to allow the cavity resonator 1 to serve also as the gas cell. Conventional nonmagnetic glass to metal sealing techniques are used for sealing the window 4. Optical resonance radiation at the optical pumping frequency is projected into the cavity through the light transparent wall 2 from a source 3 of pumping light. The light source 3 forms a feature of the present invention and will be more fully described below.

An oven 5 envelopes the light source 3 and cavity 1 for maintaining same at a constant desired temperature, as of, for example, 60° C. Three concentric magnetic shields 6, as of Moly Permalloy, surround the oven for shielding the maser apparatus from undesired extraneously produced magnetic fields. A set of three pairs of aiding connected Helmholtz coils 7, with their axes disposed along mutually perpendicular axes, $x$, $y$ and $z$, envelope the cavity resonator 1 and are separately energizable from a current source 8 for cancelling certain undesired residual magnetic fields within the cavity 1 and for providing a controllable polarizing magnetic field, $H_0$, over the cavity 1.

In operation, the pumping light intensity, temperature of the oven 5, partial pressure of the buffer gas, and Q of the cavity 1 are dimensioned to produce self-sustaining continuous maser oscillation within the cavity 1. In other words, the gain of the atomic resonance ensemble, namely, the ground state hyperfine transition of the rubidium vapor ($F=2$, $m_f=0 \rightarrow F=1$, $m_f=0$) is chosen such that spontaneous emission of radiation from the upper hyperfine energy level to the lower hyperfine energy level produces a sufficient current in the walls of the cavity to produce a magnetic field acting back on the ensemble of gaseous atoms to stimulate further coherent emission of radiation. When the gain of the ensemble is sufficiently large to compensate for the losses in the system, the apparatus will go into continuous stimulated emission of radiation and the resonance signal may be extracted from the cavity 1 via waveguide 9 which is coupled to the cavity via iris 11 and which waveguide is sealed in a gas-tight manner by means of a microwave window 12 at the output flange thereof.

As a maser oscillator in the field independent $$(F=2, m=0 \rightarrow F=1, m=0)$$

transition, the apparatus of FIG. 1 provides a secondary frequency standard of unsurpassed stability and simplicity. When operated on a field dependent hyperfine transition, the apparatus will serve as an extremely simple and precise magnetometer. When used as a magnetometer, the shields 6 would be removed such that the ensemble within the cavity 1 may be responsive to changes in the intensity of the magnetic environment.

Referring now to FIGS. 2–5, the mechanism of the light shift will be described followed by a description of the novel pumping light source apparatus of the present invention for eliminating pumping light shifts.

For an uncorrected pumping source for a rubidium maser, it is found that from zero to full pumping light intensity that the frequency of the field independent microwave transition ($F=2$, $m=0 \rightarrow F=1$, $m=0$) changes by as much as 40 cps. This light shift is due to the slight off resonance of the pumping line from the lamp as applied to the ensemble of gaseous atoms under observation. More specifically, the energy level diagram for $Rb^{87}$ is shown in FIG. 2. In a preferred method of optical pumping the $Rb^{87}$ resonance radiation obtained from a $Rb^{87}$ lamp is filtered by a $Rb^{85}$ filter to remove certain undesired special resonance lines in the resonance optical radiation of the lamp such that much more optical pumping is obtained from the $F=1$ level that from the $F=2$ level. The optical pumping depopulates the $F=1$ sublevel of the ground state of the $Rb^{87}$ atoms by exciting transitions of the atoms to higher excited energy states such as excited P states from which the atoms decay with equal probability to the $F=1$ and $F=2$ levels of the ground state. However, because the $F=1$ level of the ground state is continuously being depopulated by the optical pumping there results an overpopulation of the $F=2$ sublevel of the ground state thereby producing a nonequilibrium energy state from which microwave transitions may be obtained to the $F=1$ level at a transition frequency of approximately 6835 mc.

In the optical pumping process for $Rb^{87}$ atoms there are two primary spectral resonance lines of interest, one at approximately 7947 A., and the other at approximately 7800 A. These optical transitions correspond to transitions between the $5^2S_{1/2}$ level and $5^2P_{1/2}$ and $5^2P_{3/2}$ levels respectively. However, due to the splitting of the ground state, S level, the two primary optical resonance lines at 7947 A. and 7800 A. respectively are each split into two lines closely spaced to the original 7947 A. and 7800 A. frequencies. The split or doublet lines are separated in frequency by roughly the microwave frequency of the hyperfine transition of the ground or S state sublevels.

In the case of the 7800 A. resonance of $Rb^{87}$ (see FIG. 3), the doublet lines are depicted as resonance lines $a$ and $b$, respectively, $a$ being the lowest frequency of the doublet. In the case of the 7800 A. line of $Rb^{85}$ the split lines of the doublet are closer together in frequency and are depicted as lines A and B respectively. Line $b$ of $Rb^{87}$ is, of course, the line which it is desired to apply to the $Rb^{87}$ atoms to be pumped since this line will depopulate the $F=1$ sublevel of the ground state of the atom resulting in an overpopulation of the $F=2$ sublevel. The relative positions of the $Rb^{87}$ and $Rb^{85}$ hyperfine lines at 7800 A. are shown in FIG. 3. Lines $a$ and $b$ are separated by 1300 mc., while the separation of the other lines exceeds 2500 mc. By buffer gas pressure broadening and shifting within the $Rb^{85}$ filter, as by increasing the argon gas pressure to 52 torr, line A can be adjusted to act as an absorber for line $a$, but line B does not absorb line $b$.

The lamp and filter spectral profiles as above described for the 7800 A. line of rubidium also apply to the 7947 A. line. More specifically, the 7947 A. line comprises a doublet for both $Rb^{87}$ and $Rb^{85}$. The low frequency component of the $Rb^{87}$ doublet is absorbed by the low frequency doublet line of the $Rb^{85}$ filter while the high frequency desired $Rb^{87}$ doublet component, derived from the $Rb^{87}$ lamp, passes through the $Rb^{85}$ filter for pumping of the $Rb^{87}$ atoms.

The sign of the light shift depends upon the spectral profile of the pumping light in the following manner: If the pumping light is centered on the low frequency side of the atomic pumping transition, i.e., $h\nu_1$ of FIG. 4, the $F=1$ atomic level will be pushed to a lower energy. If the pumping light is centered on the high frequency side of the atomic resonance transition ($h\nu_2$ of FIG. 4), the $F=1$ atomic level will be pushed to a higher energy level as indicated at $h\nu_2$ of FIG. 4. Thus, low frequency pumping radiation produces a positive light shift and higher frequency pumping light produces a negative light shift.

Referring now to FIG. 5, there is shown an apparatus for optically pumping with zero light shift. The apparatus utilizes spectral radiation from two sources which radiation is adjusted to produce one light source with positive light shift and the second light source with negative light shift and the two light sources have their beams projected into the ensemble of atomic particles for pumping thereof. Either a positive or a negative light shift source can be produced by proper choice of carrier gas in the lamp and/or filter, lamp or filter temperature, the particular atomic isotopic composition in the lamp or filter and the lamp or filter geometry and mode of excitation of the lamp. Means are also provided for varying the relative intensities of the spectral lines obtained from the two sources such that the proper ratio of intensities may be selected to yield zero light shift in the pumped gas cell.

More specifically, a first spectral lamp 22 has its parameters adjusted to produce a negative light shift. A suitable lamp 22 is, for example, the Varian X–49–609 $Rb^{87}$ spectral lamp having its parameters adjusted for the negative light shift. The spectral radiation from the lamp 22 is directed into the cavity resonator 1 containing the $Rb^{87}$ atoms to be pumped for pumping thereof. A variable transmission filter 23 is disposed in the light beam of the lamp 22 between the lamp and the cavity 1 for variably controlling the intensity of the radiation transmitted to the cavity from lamp 22. A suitable variable transmission filter 23 would include a pair of polarizing plates, an electro-optical crystal, or a Kerr cell. Intermediate the variable transmission filter 23 and the cavity 1 is the aforementioned $Rb^{85}$ filter 24 for filtering out the undesired spectral lines of the lamp 22 to produce excess population of the upper hyperfine energy states of the ground state of the rubidium atoms to be pumped.

A second lamp 25, similar to the lamp 22, is provided for projecting its light beam substantially at right angles to the light beam from the first lamp 22. A half-silvered mirror 26 is disposed at the intersection of the first and second light beams and inclined at 45° to the beam for reflecting the optical radiation from the second lamp 25 into the cavity 1 for pumping of the ensemble of atomic particles therein while passing the first light beam to the cavity 1. Lamp 25 has its parameters adjusted to produce a positive light shift. A variable transmission filter 27 is provided in the light beam of the second lamp 25 between the lamp and the mirror 26 for variably controlling the intensity of the optical radiation passed from lamp 25 into the cavity 1. Variable transmission filter 27 is similar to filter 23 and functions in the same manner.

A second optical radiation filter 28, as for example, a $Rb^{85}$ cell is disposed in the beam path of the second lamp 25 between the transmission filter 27 and the mirror 26 for filtering out the certain undesired spectral lines of the lamp 25 such that the optical radiation as passed by the mirror 26 into the cavity 1 will produce an excess population in the upper hyperfine energy state of the ground state of the $Rb^{87}$ atoms.

A third variable transmission filter 29 is disposed in the combined beam paths of the light from both lamp 22 and 25 for variable controlling the total intensity of the superimposed light beams. Variable transmission filter 29 may be of the type similar to filters 23 and 27 respectively.

In operation, the ratio of intensities of the positive and negative light shift spectral radiation applied to cavity 1 from lamps 22 and 25 is adjusted via variable transmission filters 23 and 27 respectively until a point is reached at which zero light shift is observed when filter 29 is varied.

For the success of this zero light shift compensation technique it is essential that the cavity 1 be exactly on tune. If this condition is not satisfied, a frequency shift will be observed when the total light intensity is varied even if the light shift is zero. The composite resonant frequency varies with Q and frequencies as follows:

$$d\nu/dQ_l = (\nu_o - \nu_c) Q_c/Q_l$$

$\nu$ = oscillation frequency of the composite gas cell and cavity
$\nu_o$ = atomic microwave or R.F. transition frequency
$\nu_c$ = cavity resonance frequency
$Q_c$ = cavity Q
$Q_l$ = atomic line Q at the microwave or R.F. transition frequency From the above it is seen that the rate of change of the oscillation frequency with line width ($Q_l$) is zero only when the cavity is on tune ($\nu_c = \nu_o$).

In the case of the $Rb^{87}$ maser the line width or gain is not readily modified by varying the Rb pressure; however, the gain and $Q_l$ are easily changed by varying the magnetic field through the zero field condition. At zero field the effective Rb population will be highest since atoms in the ($F=2$, $m_f=0$) and ($F=2$, $m_f=\pm 1$) states all contribute to the excess population available for maser action. At fields large enough to resolve the various hyperfine Zeeman components (some hundreds of microgauss), only the ($F=2$, $m_f=0$) population will contribute to the maser action. Thus, the atomic gain is readily modified by adjusting the field from zero to a few hundred microgauss. The cavity is then tuned such that the maser frequency does not change when the field is adjusted over this range.

The above described arrangement of FIG. 5 yields a pumping light with zero light shift. However, aging of the lamps 22 and 25 or filters 25 and 28 could introduce a change in the spectral profile of the light source 3 as applied to the gas cell containing the atoms to be pumped thereby introducing a light shift. Therefore, means are provided to automatically monitor the light shift to produce an error feedback signal to control the ratio of intensities of the two light beams to maintain a zero light shift condition for the composite light source 3.

More particularly the automatic light shift control network includes a light transmission modulator 32 which supplies a suitable low frequency electrical signal as of 400 cps. to the variable common beam transmission filter 29 such as a Kerr cell. The low frequency signal thus amplitude modulates the two superimposed pumping light beams. If there is a light shift the output maser frequency will be frequency modulated at the low frequency.

An F.M. detector 33 is coupled to the output of the maser for detecting the low frequency modulation and converting same to a low frequency amplitude modulated signal. The detected low frequency signal is then compared with the original modulation signal derived from the transmission modulator 32 in a phase sensitive detector 34 to produce a D.C. error signal which is fed back to one or the other of the variable transmission filters such as filter 27 for controlling the ratio of the intensity of positive light shift beam to the intensity of the negative light shift beam to maintain the ratio correct for zero light shift.

In a preferred embodiment, the optical pumping apparatus is as shown in FIG. 5, that is, both beams enter from the same direction and they are superimposed upon each other by means of the half-silvered mirror 26. However, it is not a requirement that the light beams be superimposed and enter the cavity from the same direction. For example, they could be applied to the cavity from opposite directions via a pair of perforated end walls.

The present invention has been described as applied to an optical pumped continuous maser oscillator useful as a frequency standard or magnetometer. However, the invention is equally applicable to optically pumped and optically monitored gas cell atomic resonance devices such as frequency standards or magnetometers of the type described in U.S. Patent Application No. 653,180 filed April 16, 1957 now U.S. Patent 3,150,313 issued September 22, 1964 and assigned to the same assignee as the present invention.

The atomic resonance apparatus, previously described, is not limited to $Rb^{87}$ atoms alone. Certain other isotopes of other metals, such as, for example, thallium sodium, potassium and cesium may be used. Any electron reorientation transition or resonance in atoms or molecules for which the net atoms or molecules angular momentum, $f$ is an integer in quantum units of Planks constant, $h$, may be used. In general, it is contemplated any suitable molecular or atomic assemblage having desired resonance characteristics may be used. The terms "atom or atomic particle" as used herein is defined to mean molecules as well as atoms.

Since many changes can be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. Atomic resonance apparatus including; means forming an assemblage of gaseous atoms to be pumped; means for optically pumping said assemblage of gaseous atoms to a nonequilibrium energy state; means for exciting and detecting an R.F. atomic resonance of said assemblage of atoms; said optical pumping means including, first and second light sources for illuminating said assemblage of atoms with spectral resonance radiation corresponding to an optical resonance of said assemblage of atoms for pumping said assemblage of atoms to a nonequilibrium energy state, one of said light sources having its spectral profile arranged for illuminating said assemblage of atoms to be pumped with spectral resonance radiation producing a negative light shift in the atoms to be pumped and the other of said light sources having its spectral profile arranged for illuminating said assemblage of atoms to be pumped with spectral radiation producing a positive light shift in the atoms to be pumped, and the ratio of intensities of the illumination, as supplied to the atoms being pumped from said first and second light sources, being dimensioned such that the R.F. atomic resonance frequency of said assemblage of atoms being pumped is rendered substantially nonresponsive to proportional changes in the total intensity of said first and second light sources as applied to said assemblage of atoms.

2. The apparatus according to claim 1 including; means for variably controlling the total intensity of said spectral radiation applied to said assemblage of atoms being pumped from both said first and second sources whereby light shifts, if any, may be detected.

3. The apparatus according to claim 1 including; means for variably controlling said ratio of the intensities of the spectral radiation applied to said assemblage of atoms being pumped to variably control the total light shift.

4. The apparatus according to claim 3 including; means for amplitudes modulating the total intensity of the pumping light applied from said first and second light sources to said assemblage of atoms to be pumped; means for detecting the light shift in the detected R.F. resonance in response to said amplitude modulation of said total pumping light intensity to produce an error signal; and means responsive to said error signal for correcting the ratio of the intensity of the spectral radiation derived from the first source relative to the radiation derived from said second source to reduce said total light shift substantially to zero.

5. The method for reducing light shift in an optically pumped gaseous atomic resonance apparatus comprising the steps of, illuminating the atomic gaseous medium with spectral resonance radiation substantially at the optical pumping frequency, the illuminating optical resonance radiation having a spectral profile with one resonance spectral line being slightly displaced below the atomic resonance frequency for the optical transition of said atomic ensemble from a ground state to a higher excited state, and the other spectral line component of said spectral radiation having a frequency slightly higher than the optical transition frequency of said atom from the ground state to the higher excited state, and the ratio of the intensities of the first and second spectral lines being proportioned such that changes in the total intensity of the spectral radiation applied to said ensemble of atoms does not produce an appreciable shift in the R.F. atomic resonance frequency of said gaseous atoms.

6. An atomic frequency standard including, means for producing an assemblage of atomic gaseous particles, means for subjecting said assemblage of atomic particles to an alternating magnetic field for producing atomic resonance of said atomic particles at a ($F=2$, $m=0 \rightarrow F=1$, $m=0$) transition, means for monitoring the ($F=2$, $m=0 \rightarrow F=1$, $m=0$) transition frequency to obtain an output signal, means for optically pumping said assemblage of atoms by illumination of said assemblage of atoms with spectral resonance radiation corresponding to an optical transition of said assemblage of atoms from a lower ground state to a higher excited stated, said optical pumping means including means for producing in said resonance spectral radiation applied to said ensemble a spectral profile having a pair of resonance spectral lines, one of said resonance spectral lines being slightly lower in frequency than the optical pumping transition of said atoms of said assemblage from the ground state to the excited higher state, and the other spectral line of said radiation having a frequency slightly higher than the frequency of said optical transition of said assemblage of atoms, and the ratio of intensities of said first and second lines of the illuminating spectral radiation being proportioned such that changes in the total intensity of the spectral radiation illuminating said assemblage of atoms produces substantially no frequency shift in the ($F=2$, $m=0 \rightarrow F=1$, $m=0$) transition frequency of the assemblage of gaseous atoms, whereby an extremely stable atomic frequency standard is obtained.

7. The apparatus according to claim 6 wherein said frequency standard apparatus is an atomic maser, said means for subjecting said assemblage of atoms to alternating magnetic field for producing the resonance transition is a cavity resonator enveloping said assemblage of atoms, said cavity having a light transmissive portion for application of said illuminating optical pumping spectral radiation to said assemblage of atoms.

8. The apparatus according to claim 7 wherein said assemblage of atomic particles includes a substantial portion of $Rb^{87}$ atoms.

9. The apparatus according to claim 8 wherein said means for illuminating said assemblage of rubidium atoms with spectral resonance radiation includes a first and second $Rb^{87}$ lamp, one of said lamps projecting its optical radiation through said light transmissive portion of said cavity into said assemblage of atoms, and a half-silvered mirror included in the transmission path of the optical radiation from said first lamp and inclined at a substantial angle thereto such that optical radiation from said first lamp passes through said silvered mirror into said cavity, and said second lamp having its optical resonance radiation directed at said mirror for reflection from said mirror into said cavity resonator, and means for controlling the total intensity of said first and second light beams disposed between said mirror and said cavity for variably controlling the total intensity of the spectral radiation applied to said assemblage of atoms without varying the ratio of the intensity of said first and second spectral lines thereof.

No references cited.

ROY LAKE, *Primary Examiner.*

J. KOMINSKI, *Assistant Examiner.*